United States Patent
Citron et al.

(10) Patent No.: US 7,516,299 B2
(45) Date of Patent: Apr. 7, 2009

(54) SPLAT COPYING GPR DATA TO VECTOR REGISTER ELEMENTS BY EXECUTING LVSR OR LVSL AND VECTOR SUBTRACT INSTRUCTIONS

(75) Inventors: Daniel Citron, Haifa (IL); Ayal Zaks, Mitzpe Aviv (IL)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 11/214,348

(22) Filed: Aug. 29, 2005

(65) Prior Publication Data
US 2007/0050598 A1   Mar. 1, 2007

(51) Int. Cl.
*G06F 9/315* (2006.01)
(52) U.S. Cl. .......................................... 712/4; 712/22
(58) Field of Classification Search ........................ None
See application file for complete search history.

(56) References Cited

U.S. PATENT DOCUMENTS

| | | | |
|---|---|---|---|
| 4,760,518 A | 7/1988 | Potash et al. | |
| 4,964,035 A | 10/1990 | Aoyama et al. | |
| 5,073,864 A * | 12/1991 | Methvin et al. | 708/212 |
| 5,437,043 A | 7/1995 | Fujii et al. | |
| 5,611,062 A * | 3/1997 | Webb et al. | 712/200 |
| 6,006,315 A | 12/1999 | Park | |
| 6,571,328 B2 | 5/2003 | Liao et al. | |
| 7,047,393 B2 * | 5/2006 | Paver et al. | 712/34 |
| 2006/0190700 A1 * | 8/2006 | Altman et al. | 712/7 |
| 2007/0011441 A1 * | 1/2007 | Eichenberger et al. | 712/221 |

FOREIGN PATENT DOCUMENTS

JP      11-242598      9/1999

* cited by examiner

*Primary Examiner*—Kenneth S Kim

(57) ABSTRACT

A method for transferring data from a general purpose register (GPR) to a vector register (VR), the method including vectorially combining data in the VR from the GPR, by executing instructions of a PowerPC Instruction Set Architecture (ISA), the step of combining including splatting a low nibble from the GPR into a low nibble in each element of a first VR by executing two "load vector for shift left" (lvsl) or "load vector for shift right" (lvsr) and one "vector subtract unsigned byte modulo" (vsububm), shifting a high nibble of the GPR into a low nibble the GPR, splatting the low nibble of the GPR into a low nibble in each element of a second VR by re-executing the two lvsl or lvsr and one vsububm instructions, shifting the low nibble of the second VR into a high nibble of the second VR and combining both first and second VRs into one VR.

3 Claims, 3 Drawing Sheets

SPLAT COPYING GPR DATA TO VECTOR REGISTER ELEMENTS BY EXECUTING LVSR OR LVSL AND VECTOR SUBTRACT INSTRUCTIONS

FIELD OF THE INVENTION

The present invention relates generally to vector processing, and more particularly to transferring data directly from a general purpose register to a vector register.

BACKGROUND OF THE INVENTION

Many microprocessors operate with Vector architectures and include a Vector Processing Unit (VPU). Vector architectures enable simultaneous processing of many data items in parallel. Operations may be performed on multiple data elements by a single instruction—referred to as Single Instruction Multiple Data (SIMD) parallel processing.

Many implementations of a VPU may use dedicated register files that are disjoint from a General Purpose Register (GPR) file. There is accordingly a need to transfer data from the GPR to a Vector Register (VR).

Prior art solutions for transferring data from the GPR to the VR may be classified into three main approaches. The first approach stores data from a GPR to memory and then loads the data from the memory into a VR. An example of this approach is embodied in AltiVec. AltiVec (trademark of Motorola, Inc.) is a high bandwidth, parallel operation vector execution unit developed as a SIMD extension to the PowerPC ISA (instruction set architecture). AltiVec is a vector architecture that can process multiple data streams/blocks in a single cycle. However, transferring data indirectly through memory has disadvantages. It is time consuming and can cause pipeline stalls.

A second approach provides explicit instructions to transfer data to/from the register files. Intel's MMX/SSE/SSE2/SSE3 technologies employ this solution. However, this has the disadvantage of adding additional instructions to the architecture. While the additional instructions may be acceptable for a CISC (Complete Instruction Set Computer), they are undesirably limiting for a RISC (Reduced Instruction Set Computer).

A third approach has the vector and scalar registers share the same file. In this manner the vector and scalar instructions access the same physical register, eliminating the need to transfer data between them. This was the original implementation of Intel's MMX technology. However, it has the disadvantage of reducing the number of registers available to the processor.

SUMMARY OF THE INVENTION

The present invention seeks to provide an improved method for transferring data directly from a general purpose register or floating point register (also referred to as an integer register, the terms being used interchangeably throughout the specification and claims) to a vector register, as is described more in detail hereinbelow.

In one embodiment of the invention, the method includes vectorially combining data in the vector register (VR) from the general purpose register (GPR), by executing instructions of a PowerPC Instruction Set Architecture (ISA), the step of combining including splatting a low nibble from the GPR into a low nibble in each element of a first VR by executing two "load vector for shift left" (lvsl) or "load vector for shift right" (lvsr) and one "vector subtract unsigned byte modulo" (vsububm), shifting a high nibble of the GPR into a low nibble the GPR, splatting the low nibble of the GPR into a low nibble in each element of a second VR by re-executing the two lvsl or lvsr and one vsububm instructions, shifting the low nibble of the second VR into a high nibble of the second VR and combining both first and second VRs into one VR.

In accordance with another embodiment of the invention, the instructions comprise instructions used for Single Instruction Multiple Data parallel processing

BRIEF DESCRIPTION OF THE DRAWINGS

The present invention will be understood and appreciated more fully from the following detailed description taken in conjunction with the appended drawings in which.

DETAILED DESCRIPTION OF EMBODIMENTS

The present invention implements existing instructions used with Vector Processing Units (VPUs), particularly for VPUs that operate with Single Instruction Multiple Data (SIMD) parallel processing, in order to transfer data directly from a general purpose register (GPR) to a vector register (VR) without going through a memory in between. For convenience, the invention will be described hereinbelow with instructions used in the AltiVec parallel operation vector execution unit. However, the invention is not limited to the instruction set of AltiVec, and the invention can be carried out with other VPUs and instruction sets.

The parallel processing capability of AltiVec may include vector permute operations. Some of the instructions for performing permute operations are the lvsl and lvsr instructions of the PowerPC Instruction Set Architecture (ISA). The lvsl and lvsr instructions are load instructions, and they respectively stand for "load vector for shift left" and "load vector for shift right". The format of the instructions is as follows:

lvsl vD,rA,rB (and similarly lvsr vD,rA,rB)

wherein vD is the resulting vector register and rA, rB are integer registers.

The lvsl and lvsr instructions are used to create permute masks for loading or storing unaligned (alternatively referred to as misaligned) data. Specifically, they calculate a "shift permutation vector" for use with unaligned data. These instructions take the lowest 4 bits (nibble) of a GPR (calculated as an index from rA and rB) and write the nibble into the first byte of a vector register. The successive bytes contain the previous byte values plus 1. The lvsl and lvsr instructions may be used with a "vperm" instruction to format the data, based upon the nibble. The vperm instruction allows swapping the bytes in a vector register based upon another vector register that contains the required order (permutation) of the bytes. For example, a combination of the lvsl and lvsr instructions together with the vperm instruction may be used to read in two sets of 16 bytes and then extract the middle 16 bytes.

Figure 1A:
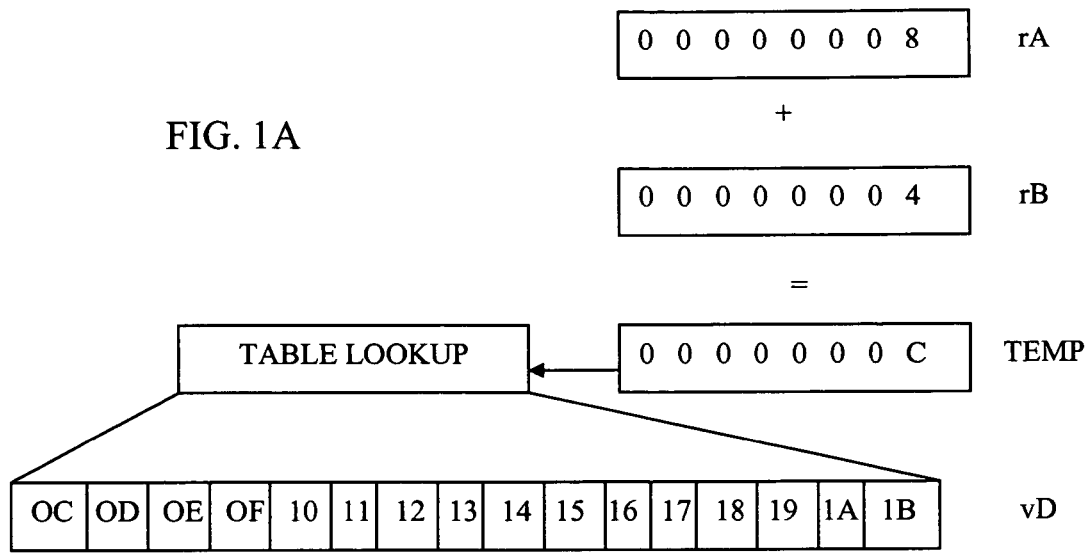
FIG. 1A is a simplified block diagram illustration that shows how vector processing load instructions may be used to insert the lowest 4 bits of integer registers into 16 bytes of a resulting vector register.

FIG. 1A is a simplified illustration that shows how the lvsl or lvsr instruction inserts the low nibble of the integer registers rA+rB into the 16 bytes of the resulting vector register vD.

The lvsl and lvsr instructions are the only ones in the Altivec ISA that define the contents of a VR based on a GPR.

Figure 1B:
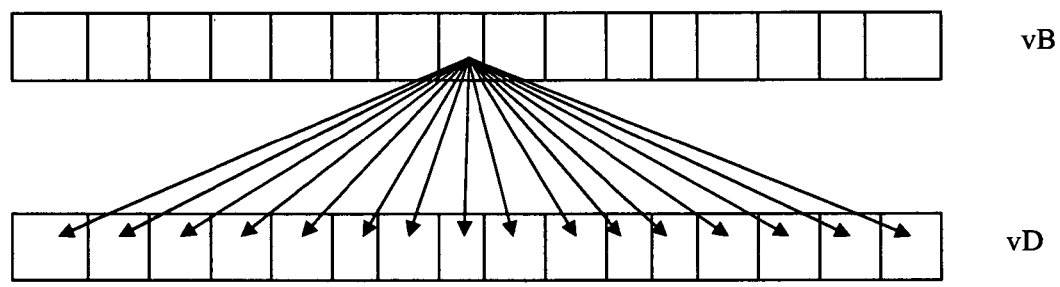
FIG. 1B is a simplified block diagram illustration that shows how a vector processing instruction (in AltiVec) takes a vector register and index and copies the value in that index across a result register.

These instructions may be used to "splat" (that is, copy into every item) a scalar data value across a vector register. In AltiVec, this is usually performed with the so-called vec_splat intrinsic instruction, which takes a vector register and index and copies the value in that index across the result register, as shown in FIG. 1B.

The following code sequence is an example of instructions for splatting a scalar data value across a vector register, using AltiVec instruction terminology and nomenclature:

```
achar tchar = (char)c; /* copy data into an aligned-on-16-byte address */
vChar = vec__lde(0,(unsigned char*)&tchar); /* load scalar from memory into a vector register */
vChar = vec__splat(vChar,0); /* splat the data */
```

Figure 2:
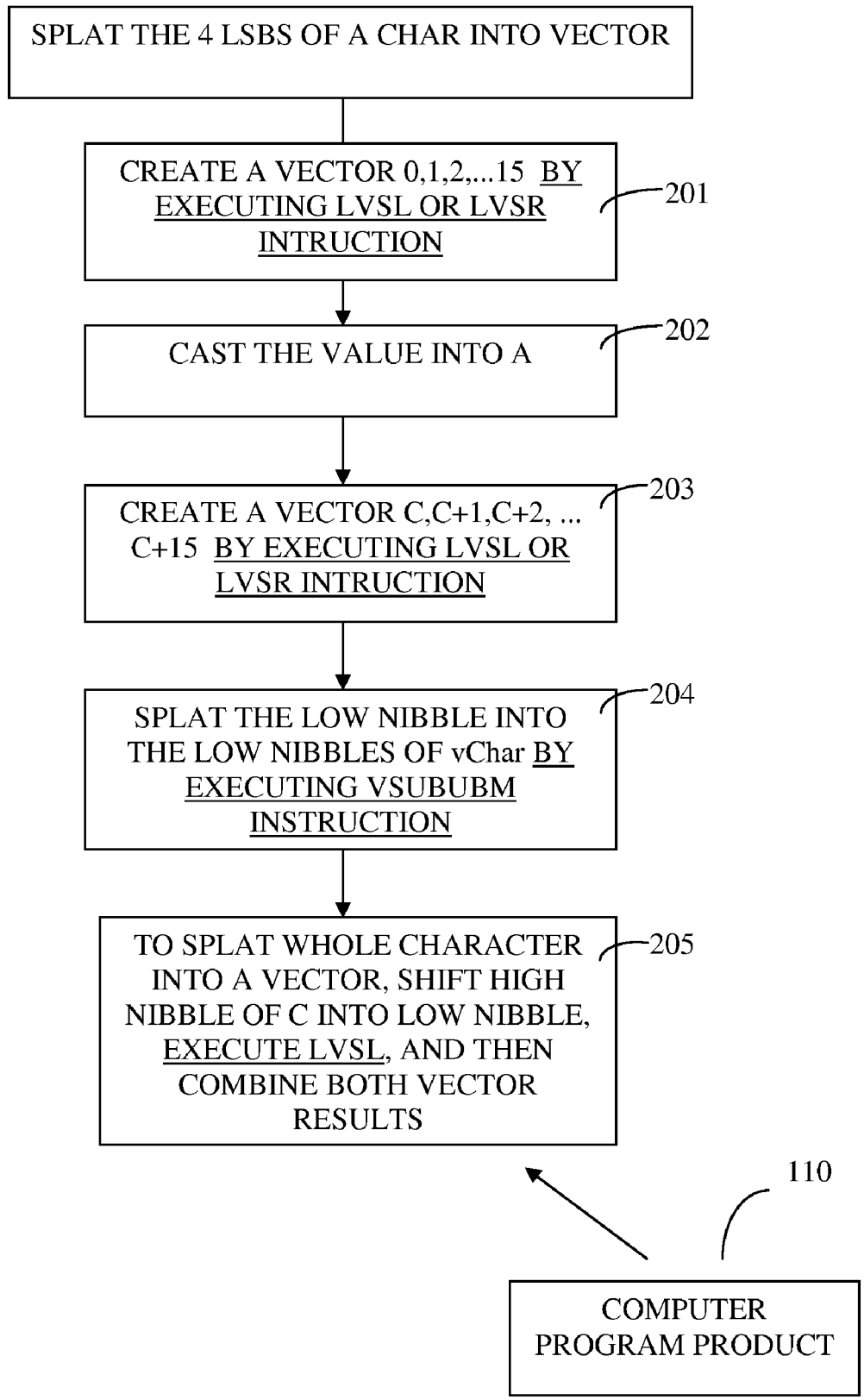
FIG. 2 is a simplified flow chart of a method for transferring data directly from a general purpose register to a vector register in accordance with an embodiment of the present invention, wherein four Least Significant Bytes (LSBs) of data are splat into a vector register, and then the whole character is splat into the vector register by shifting a high nibble into a low nibble and combining vector results.

As mentioned before, the present invention provides a method for transferring data directly from a general purpose register (integer register) to a vector register. In one non-limiting embodiment of the invention, a set of instructions are provided for splatting a byte value in a GPR into a VR, as is now explained with reference to FIG. 2.

In a simplified embodiment of the invention, the four Least Significant Bytes (LSBs) of a char (data from the GPR) may be splat into a vector register (using AltiVec instruction terminology and nomenclature):

v1=lvsl(r)−lvsl(0) /*executing vector subtract unsigned byte modulo (vsububm) */

An example of C code that performs this (assuming that c is in the lower nibble) is:

```
vAlign = vec__lvsl(0,(unsigned char *)0); /* create a vector
  0,1,2,...15 */ (step 201)
ptr = (unsigned char*)c; /* cast the value into a pointer */ (step 202)
vChar = vec__lvsl(0,(unsigned char *)ptr); /* create a vector
  c,c+1,c+2, ... c+15 */ (step 203)
vChar = vec__sub(vChar,vAlign); /* splat the low nibble into the low
  nibbles of vChar */ (step 204)
```

To splat the whole character into a vector, one may shift the high nibble of c into the low nibble, use lvsl, and then combine both vector results (step 205):

v1=lvsl(r)−lvsl(0)

v2=lvsl(r>>4)−lvsl(0)

v3=v2<<4|v1(or add them together).

Figure 3:
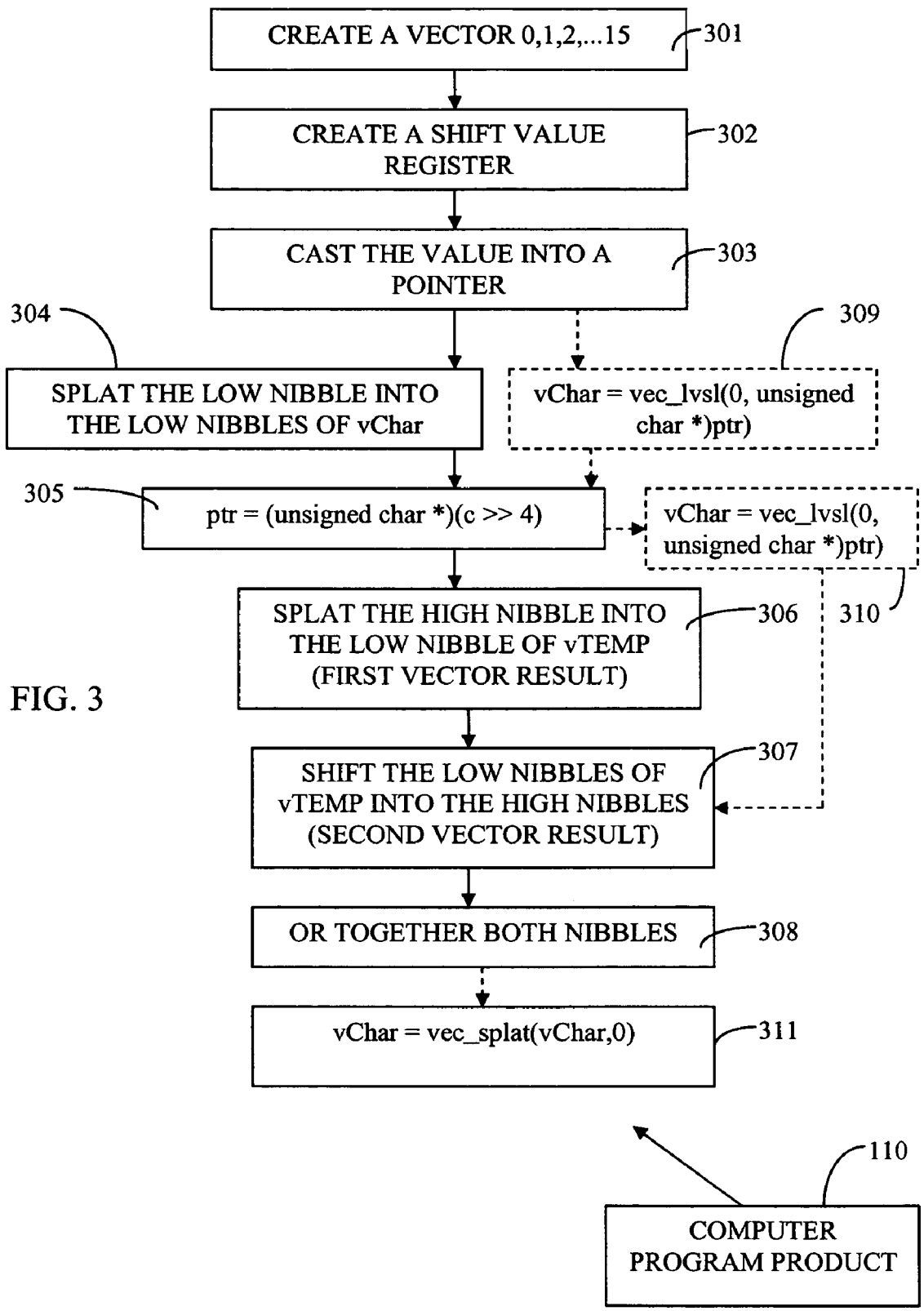
FIG. 3 is a simplified flow chart of a faster method for transferring data directly from a general purpose register to a vector register in accordance with another embodiment of the present invention, wherein the whole character is splat into the vector register.

The invention, of course, is not limited to the above code that splats the 4 LSB into the VR. Rather the invention encompasses other methods for splatting the whole character into the VR, an example of which is now explained with reference to FIG. 3.

An example of the C code that copies the value in character c to the vector vChar is the following:

```
vAlign = vec__lvsl(0,(unsigned char *)0); /* create a vector
  0,1,2,...15 */ (step 301)
sval = vec__splat_u8(4); /* create a shift value register */ (step 302)
ptr = (unsigned char*)c; /* cast the value into a pointer */ (step 303)
vChar = vec__sub(vec__lvsl(0,(unsigned char *)ptr),vAlign); /* splat
  the low nibble into the low nibbles of vChar */ (step 304)
ptr = (unsigned char *)(c >> 4); (step 305)
vTemp = vec__sub(vec__lvsl(0,(unsigned char *)ptr),vAlign); /* splat
  the high nibble into the low nibble of vTemp (first vector result)*/
  (step 306)
vTemp = vec__sl(vTemp,sval); /* shift the low nibbles of vTemp into
  the high nibbles (second vector result)*/ (step 307)
vChar = vec__or(vChar,vTemp); /* OR together both
  nibbles */ (step 308)
```

The latter code is longer, nevertheless, it is much faster. In testing, when compiled using xlc 7.0 with the flags -O3 -qaltivec -qarch=ppc970 -q64 and then executed on a PowerPC 970 processor, a speedup of 1.7 was obtained.

An even faster method for splatting the whole character into the VR may be obtained with the following optional instructions that follow step 303:

```
vChar = vec__lvsl(0, unsigned char *)ptr); (step 309)
ptr = (unsigned char *)(c >> 4); (step 305)
vChar = vec__lvsl(0, unsigned char *)ptr); (step 310)
vTemp = vec__sl(vTemp,sval); (step 307)
vChar = vec__or(vChar,vTemp); (step 308)
vChar = vec__splat(vChar,0); (step 311)
```

The sub instructions and the vec_lvsl of 0 (steps 304 and 306) have been omitted, while a vec_splat (step 311) has been added.

The splat operation has significant importance in many applications. For example, a vectorizing strchr function—strchr(str,c) returns the position of the character c in string str or 0 if it does not exist. Another use is in pixel-blending applications where a char value used to mask two images must be copied across several vectors.

It is noted that the methods described herein may be carried out by a computer program product 110, such as but not limited to, Network Interface Card, hard disk, optical disk, memory device and the like, which may include instructions for carrying out the methods described herein.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for transferring data from a general purpose register (GPR) to a vector register (VR), the method comprising of:

vectorially combining data in the VR from the GPR, by executing instructions of a PowerPC Instruction Set Architecture (ISA), said step of combining comprises:

splatting a low nibble from the GPR into a low nibble in each element of a first VR by executing two "load vector for shift left" (lvsl) or "load vector for shift right" (lvsr) and one "vector subtract unsigned byte modulo" (vsububm);
shifting a high nibble of the GPR into a low nibble of the GPR;
splatting the low nibble of the GPR into a low nibble in each element of a second VR by re-executing the two lvsl or lvsr and one vsububm instructions;
shifting the low nibble of the second VR into a high nibble of the second VR; and
combining both first and second VRs into one VR.

2. The method according to claim 1, wherein said instructions comprise instructions used for Single Instruction Multiple Data parallel processing.

3. A computer program product for transferring data from a general purpose register (GPR) to a vector register (VR), said computer program product comprising:
a computer readable medium;
instructions for vectorially combining data in the VR from the GPR, by executing instructions of a PowerPC Instruction Set Architecture (ISA), wherein said instructions comprise:
instructions for splatting a low nibble from the GPR into a low nibble in each element of a first VR by executing two "load vector for shift left" (lvsl) or "load vector for shift right" (lvsr) and one "vector subtract unsigned byte modulo" (vsububm);
instructions for shifting a high nibble of the GPR into a low nibble of the GPR;
instructions for splatting the low nibble of the GPR into a low nibble of in each element of a second VR by re-executing the two lvsl or lvsr and one vsububm instructions;
instructions for shifting the low nibble of the second VR into a high nibble of the second VR; and
instructions for combining both first and second VRs into one VR; and
wherein said program instructions are stored on said computer readable medium.

* * * * *